United States Patent [19]
Rowe et al.

[11] 3,734,121
[45] May 22, 1973

[54] FLUID FLOW VALVES

[75] Inventors: Alan Charles Rowe, East Chinnock, Near Yeovil, Somerset; John Richardson Bennett, Yeovil, Somerset, both of England

[73] Assignee: Normalair-Garrett (Holdings) Limited, Yeovil, Somerset, England

[22] Filed: Nov. 5, 1971

[21] Appl. No.: 195,993

[30] Foreign Application Priority Data
 Nov. 20, 1970 Great Britain.....................55,348/70

[52] U.S. Cl.................................................137/220
[51] Int. Cl..............................................F16k 31/12
[58] Field of Search........................................137/220

[56] References Cited
UNITED STATES PATENTS
2,044,437  6/1936  MacPherson........................137/220

*Primary Examiner*—Henry T. Klinksiek
*Attorney*—Roberts B. Larson et al.

[57] ABSTRACT

An in-line fluid flow valve in which the valve head is modulated to maintain substantially a desired delivery flow pressure by means of fluid from upstream of the valve head being reduced in pressure and fed to a datum pressure chamber operably associated with the valve head. The pressure being fed to the datum pressure chamber is regulated by means of a bleed valve which is itself regulated by variations of the delivery flow pressure.

10 Claims, 1 Drawing Figure

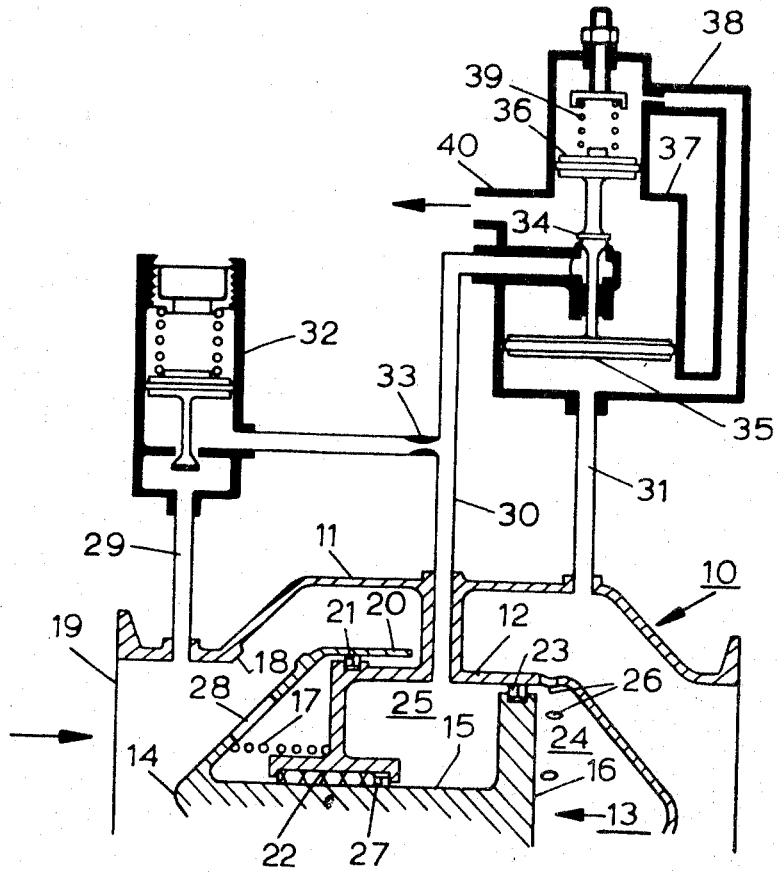

FLUID FLOW VALVES

This invention relates to fluid flow valves, and especially but not exclusively to pneumatic valves. The invention is particularly applicable to in-line valves, that is to say, valves having a valve head which moves axially in substantial alignment with the fluid flow path through the valve. However, the invention is not restricted to this application.

It is an object of the invention to provide simple and effective control means for substantially maintaining a desired condition of fluid flow from a valve, a further object being the provision of a valve and associated control means that together form a compact assembly.

According to the invention we provide, for a fluid flow valve having a valve head movable to adjust fluid flow through the valve, control means comprising a differential pressure-sensitive mechanism adapted for operative association with said valve head and to be connected to respond to departure from a selected difference between a datum pressure and the pressure of the valve-controlled fluid downstream of the valve head to cause movement of the valve head in the sense to restore said selected pressure difference, and means for deriving said datum pressure from the valve controlled fluid upstream of the valve head, said means including a pressure reducing valve having a datum pressure discharge, a bleed valve connected to said datum pressure discharge, and means for adjusting said bleed valve in response to variations in the pressure of the valve-controlled fluid downstream of the valve head.

Desirably and in accordance with a further feature of the invention, the bleed valve adjusting means comprise a pair of fluid spaces separated by a wall movable in response to a difference between the respective fluid pressures in said spaces thereby to adjust said bleed valve, and conduit means providing fluid flow paths of different flow resistance to the respective spaces and adapted to connect each to the controlled fluid downstream of said valve head in a manner such that a change in said downstream controlled fluid pressure results in a pressure differnece between said spaces, of magnitude related to the rate of said controlled fluid pressure change, effective to cause by adjustment of the bleed valve a change of datum pressure in the sense contrary to the change in downstream controlled fluid pressure.

The said movable wall may comprise rolling diaphragm means or it may take other forms, such as piston means, a preferred form comprising a pair of pistons movable in individual cylinders defining the respective said fluid spaces and connected in opposition, one said piston being of smaller effective area than the other and resilient means acting to supplement the force applied to said smaller area piston by fluid pressure in its cylinder, said fluid pressure being obtained therein via the flow path having greater flow resistance.

The invention also consists in a fluid flow valve having the aforesaid control means in operative combination therewith. Desirably such a valve includes a displaceable wall bounding a datum pressure chamber and having its external face exposed to the valve-controlled fluid downstream of said valve head, said wall being operatively connected to said valve head to move the latter in valve- closing direction by displacement of the wall in response to rising downstream controlled fluid pressure, and conversely.

The invention will now be described by way of example with reference to the accompanying drawing, which schematically illustrates an in-line valve with control means for regulating the pressure of air delivered to a duct.

The in-line valve 10 shown in the drawing comprises a substantially tubular casing 11 supporting coaxially within its interior a valve housing 12 supporting a valve assembly 13 formed by a valve head 14 secured by a spindle 15 to a piston 16. The valve assembly 13 is urged in an upstream direction (to the left in the drawing) by a light spring 17 towards closing with the annular face 18 at the downstream end of the inlet duct 19. The valve head 14 is formed with a skirt 20 which slides over an annular seal 21 mounted about the periphery of the valve housing 12, whilst the spindle 15 slides in a plain bearing 22 supported in the centre of the valve housing 12. The piston 16, having a piston ring seal 23, slides in a chamber 24, whereby the chamber 24 is divided to create a datum pressure chamber 25 behind the piston 16. The wall of the chamber 24 is provided with holes 26, which enable the face of the piston 16 to sense downstream pressure. Leakage from upstream of the valve head 14 is substantially prevented from passing the plain bearing 22 by a seal 27. In order that there shall be no pressure differential across the valve head 14, one or more holes 28 are provided therethrough. Three external conduit connections are provided, the first being an upstream connection 29, the second a datum pressure chamber connection 30, and the third a downstream connection 31, all of which communicate with valve control means. The first connection 29 supplies fluid at upstream pressure to a pressure reducer 32 which, by way of an orifice 33, passes fluid at a predetermined pressure into the second external connection 30 and by way of an extension thereof to a bleed valve 34. The bleed valve 34 is formed on a spindle between a larger control piston 35 and a smaller control piston 36 in a stepped cylinder 37. The third connection 31 from the in-line casing 11 conveys downstream fluid pressure to the face of the larger control piston 35 and by a constricted duct 38 to the face of the smaller control piston 36, so that the effective pressures on the pistons are opposing one another. The effective pressure on the smaller control piston 36 is supplemented by a spring 39. The region of the stepped cylinder 37 about the bleed valve 34 is provided with a connection 40 to ambient.

In operation of the invention, when the in-line valve is delivering fluid flow at a desired downstream pressure, that pressure is effective upon the pistons 35, 36, whereby, due to the difference in area of the pistons and effect of the spring 17, the bleed valve 34 is held slightly open so as to permit a small escape of some of the fluid supplied from the pressure reducer 32 to the datum pressure chamber 25 at a pressure which holds the piston assembly 16 substantially at a position which creates that downstream pressure. Should the downstream pressure rise it becomes effective on the control pistons 35, 36, and causes the bleed valve to open further, which allows more fluid to bleed and so reduce the pressure in datum pressure chamber 25, with consequent movement of the piston assembly towards closing, so that downstream pressure falls to the desired pressure. With a fall in downstream pressure converse action takes place to re-establish the desired pressure. A very slow rate of change of downstream pressure is substantially equal in its effect upon the two control pistons 35, 36, because the constriction of duct 38 has substantially no throttling effect on the flow through it; however, with a sudden and more significant change of downstream pressure the immediate effect upon the control pistons 35, 36, is unequal, because time. Sudden the constriction of duct 38 throttles the fluid flowing to or from the smaller control piston 36 and, therefore, equalisation of pressure effective on the two control pistons 35, 36, takes some small period of time.- Sudden inequality of pressure affecting the control pistons 35, 36, causes a maximum response that is immediately attained and then gradually attenuated as the pressures equalise, due to the fluid passing through the constriction of duct 38. This condition, when extreme, can cause the valve assembly 13 to overshoot the position at which it would be in balance to correct the change of downstream pressure; however, due to the reducing difference in effect upon the control pistons 35, 36, this action is increasingly countered and the valve assembly returns through that position of balance to the position at which it substantially maintains a desired condition of flow (i.e. pressure), without any significant hunting.

It will be understood that arrangements alternative to the embodiments herein described and illustrated may be provided without departing from the scope of the present invention, and that, likewise, modifications may be made, for example, the control pistons of the control means may be substituted by diaphragms, or the valve head of the in-line valve can be arranged to close by extending closely into the bore of the inlet duct. The holes in the wall of the piston chamber in the in-line valve can be in various positions, patterns or sizes, or the piston chamber can be open-ended.

We claim as our invention:

1. For a fluid flow valve having a valve head movable to adjust fluid flow through the valve, contol means comprising a differential pressure-sensitive mechanism adapted for operable connection with said valve head and to be connected to respond to departure from a selected difference between a datum pressure and the pressure of the valve-controlled fluid downstream of the valve head to cause movement of the valve head in the sense to restore said selected pressure difference, and means for deriving said datum pressure from the valve-controlled fluid upstream of the valve head, said means including a pressure reducing valve having a datum pressure discharge, a bleed valve connected to said datum pressure discharge, and actuator means operated by differential pressure for adjusting said bleed valve in response to variations in the pressure of the valve-controlled fluid downstream of the valve head.

2. Control means according to claim 1, wherein said bleed valve adjusting means comprise a pair of fluid spaces separated by a wall movable in response to a difference between the respective fluid pressures in said spaces thereby to adjust said bleed valve, and conduit means providing fluid flow paths of different flow resistance to the respective spaces and adapted to connect each to the controlled fluid downstream of said valve head in a manner such that a change in said downstream controlled fluid pressure results in a pressure difference between said spaces, of magnitude related to the rate of said controlled fluid pressure change, effective to cause by adjustment of the bleed valve a change of the datum pressure in the sense contrary to the change in downstream controlled fluid pressure.

3. Control means according to claim 2, wherein said movable wall comprises rolling diaphragm means.

4. Control means according to claim 2, wherein said movable wall comprises piston means.

5. Control means according to claim 4, wherein said movable wall comprises a pair of pistons movable in individual cylinders defining the respective said fluid spaces and connected in opposition, one said piston being of smaller effective area than the other and resilient means acting to supplement the force applied to said smaller area piston by fluid pressure in its cylinder, said fluid pressure being obtained therein via the flow path having greater flow resistance.

6. Control means according to claim 5, including a spindle connecting said pistons and carrying a valve head co-operating with a valve seat to constitute said bleed valve.

7. A fluid flow valve having a valve head movable to adjust fluid flow through the valve, in operative combination with control means in accordance with claim 1.

8. A fluid flow valve according to claim 7, wherein said differential pressure-sensitive mechanism comprises a displaceable wall bounding a datum pressure chamber and having its external face exposed to the valve-controlled fluid downstream of said valve head, said displaceable wall being operatively connected to said valve head to move the latter in valve-closing direction by displacement of the wall in response to rising downstream controlled fluid pressure, and conversely.

9. An in-line valve according to claim 8, wherein said valve head is a pressure-balanced axially movable member supported by an inner valve housing accommodating said datum pressure chamber.

10. A valve according to claim 9, wherein said valve head member provides a closure for an annular controlled fluid passage.

* * * * *